(12) United States Patent
Tackett

(10) Patent No.: US 7,050,050 B2
(45) Date of Patent: May 23, 2006

(54) METHOD FOR AS-NEEDED, PSEUDO-RANDOM, COMPUTER-GENERATED ENVIRONMENTS

(75) Inventor: Gregory B. Tackett, Huntsville, AL (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 768 days.

(21) Appl. No.: 10/021,701

(22) Filed: Dec. 7, 2001

(65) Prior Publication Data

US 2003/0184541 A1    Oct. 2, 2003

(51) Int. Cl.
*G06T 17/00*    (2006.01)
(52) U.S. Cl. .................................................. 345/419
(58) Field of Classification Search ............... 345/419, 345/629, 630, 632, 633, 473, 474, 475, 706, 345/848, 850, 952, 959, 960
See application file for complete search history.

(56) References Cited

U.S. PATENT DOCUMENTS

| | | | | |
|---|---|---|---|---|
| 4,835,532 | A | | 5/1989 | Fant ........................... 345/611 |
| 5,625,765 | A | * | 4/1997 | Ellenby et al. ............. 345/633 |
| 5,850,352 | A | * | 12/1998 | Moezzi et al. .............. 345/419 |
| 6,054,991 | A | | 4/2000 | Crane et al. ................ 345/420 |
| 6,084,587 | A | | 7/2000 | Tarr et al. ................... 345/419 |
| 6,128,019 | A | | 10/2000 | Crocker, III et al. ....... 345/419 |
| 6,241,609 | B1 | | 6/2001 | Rutgers ....................... 463/31 |
| 6,275,227 | B1 | | 8/2001 | DeStefano .................. 345/968 |

OTHER PUBLICATIONS

Chenney et al., "Efficient Dynamics Modeling for VRML and Java", VRML 1998.*
Smith, "Essential Techniques for Military Modeling & Simulation" Proceedings of the 1998 Winter Simulation Conference, 199.*
Tackett, Representation of Urban/Suburban-Sprawl Through Real-Time Generation of Pseudo-Random Cultural Feature Entities, Paper presented at the Nov. 27-30, 2000, International/Intra-Service Training, Simulation, and Education Conference in Orlando, Florida and subsequently published by said organization.

* cited by examiner

*Primary Examiner*—Almis R. Jankus
(74) *Attorney, Agent, or Firm*—Dayn T. Beam

(57) ABSTRACT

A method for as-needed, pseudo-random, computer-generated environments. The as-needed step allows for that area of the environment actually in use to be instantiated only as needed and only for as long as it remains in use. The as-needed step allows for a potentially infinite environment (as to size and detail) while minimizing the opportunity and resource costs to create and store such an environment. The pseudo-random step allows any degree of creative freedom or control in the presentation (e.g., size, shape, location, orientation, movement, density, transparency, etc.) of the environment and components within any required rule sets. An optional step would combine the concept of "nested fidelity" with the as-needed and pseudo-random steps. The "nested fidelity" step allows for successively greater levels of detail to be given to components only as needed.

9 Claims, 1 Drawing Sheet

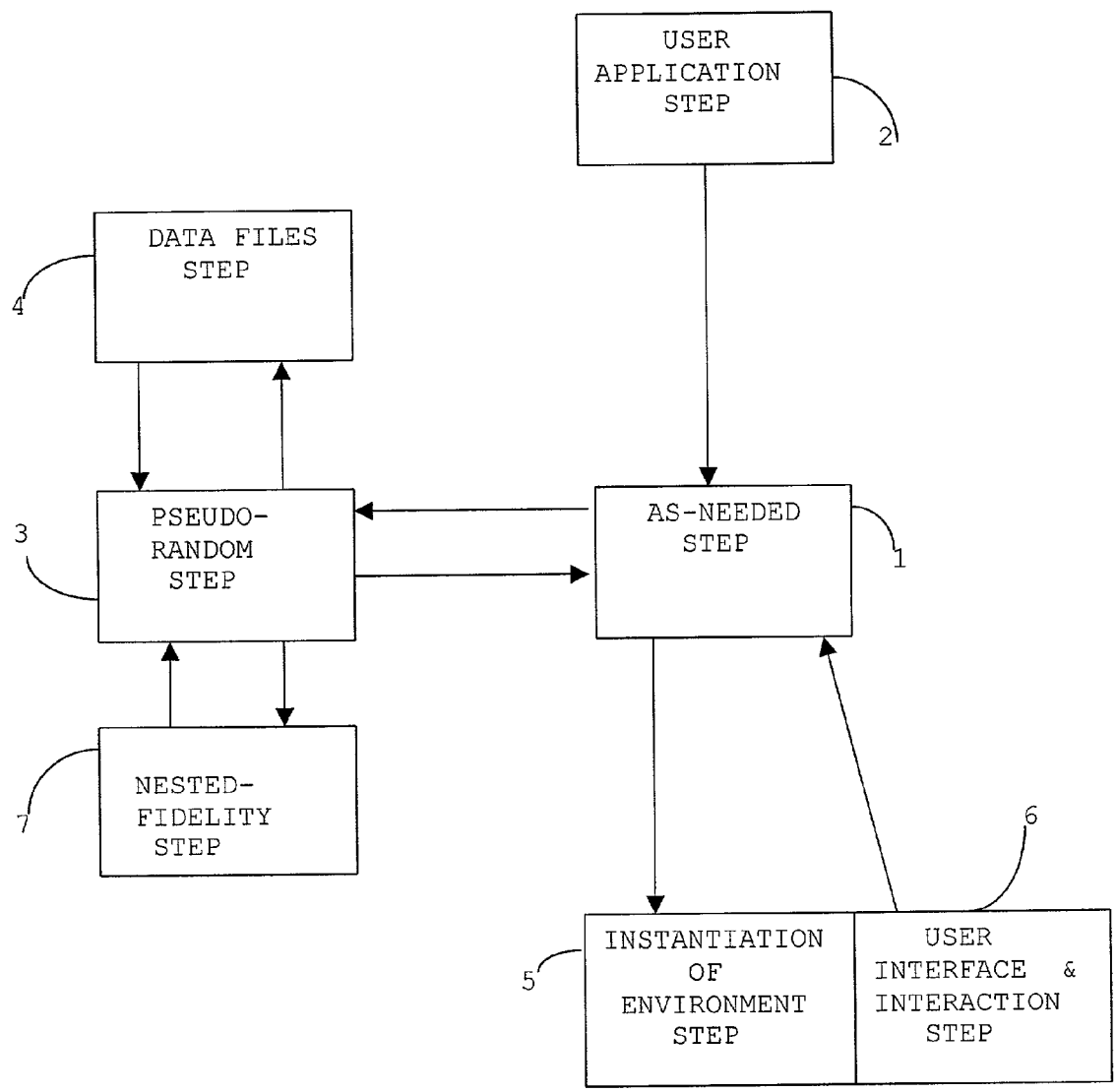

METHOD FOR AS-NEEDED, PSEUDO-RANDOM, COMPUTER-GENERATED ENVIRONMENTS

DEDICATORY CLAUSE

The invention described herein may be manufactured, used and licensed by or for the Government for governmental purposes without the payment to me of any royalties thereon.

BACKGROUND OF THE INVENTION

Numerous fields employ computer-generated environments for a variety of purposes (e.g., as fantasy effects in games or for real-world simulations). The United States Army has identified a training need for a realistic computer-generated urban sprawl environment. Ideally, such an environment would: be capable of extensive detail (to include the interiors of buildings, vehicles and other objects); have infinite variations to avoid "learning" the simulation; employ pseudo-random generation of environments to avoid repeating known patterns; be able to exactly recreate a prior environment; operate so as to minimize the resource and opportunity costs for creating and maintaining the environment; and take advantage of external data files for the generation of components.

Current and traditional methods for computer-generated environments typically utilize a pre-established environment. Such pre-established environments (to include components) are created in their entirety prior to use. (This could be from an existing file or could be generated just prior to use.) Such pre-existing environments are inherently limited by: the opportunity and resource costs associated with the extensive data handling requirements; the ability to create and retain a certain amount of environment containing features, objects, and associated details; the ability to store and recall an original environment and a changed environment; and the ability to maintain the environment in real-time interactions. The practical limitations of these prior art methods can lead to recognizable and repeating patterns, which may adversely affect the objectives for using a realistic computer-generated environment. Similar limitations would apply to the level of detail possible in prior art methods. For example, during anti-terrorist training, the detection and deactivation of an explosive device wired into the electrical system of a specific vehicle might require that the interior wiring of that vehicle be presented in great detail to accomplish the purpose of the training. If you then have a large garage full of vehicles, it would be impractical, if not impossible, under prior art methods to create and maintain so many vehicles in such detail.

Because of the extensive amount of data being generated, maintained, stored, and manipulated, these prior art methods have high opportunity and resource costs which result in computer-generated environments which are restricted in one or more of the following ways: the size of the environment; the quantity, variety, and detail of available components; and allowable interactions between users and components. One object of this invention is to overcome these inherent prior art restrictions.

In U.S. Pat. No. 6,128,019 there is disclosed a "method for creating a large-scale synthetic environment simulation which can be used in real-time." The disclosed method provides for a varying level of detail by "regions of interest", for fully establishing only desired regions of the environment, and for updating individual components without recompiling the whole environment. This varying level of detail applies to a fixed range of detail which is available to the entire environment. Within this limited range of detail, priority is given to maximizing the detail in those regions of the greatest interest. This patent does not teach or disclose the use of pseudo-random selection (randomness within preset rules) of components and details to match the variety and randomness of real world conditions. This lack of pseudo-randomness results in simulated environments which might become predictable or are limited to only what is expected. The level of detail available for any given component must be essentially unlimited if the intent is to replicate a real world object. The method of this patent does not teach or disclose the use of continuously increasing levels of detail being given to components via pseudo-random selection and on an as-needed basis. The cited patent does provide for varying the level of detail on a priority basis; however, it does not teach or disclose the much more efficient method of completely disregarding unneeded regions and generating only those regions needed and only for so long as they are needed.

There are many current apparatuses and means for creating images for use within a simulated environment, for processing environment structure and components for display to a user, and for providing varying degrees of realistic human interaction with these virtual realities. The method disclosed in the present invention is focused upon a unique way to employ all of these current (and to be developed) apparatuses and means to provide a computer-generated environment which is essentially unrestricted as to the area available, the degree and realism of interactions with the environment, and the levels of detail, variety and occurrence of components.

SUMMARY OF THE INVENTION

This method for as-needed, pseudo-random, computer-generated environments comprises of two essential steps (as-needed instantiation of the environment and its components and the pseudo-random selection of environmental components) and one highly desirable step (nested fidelity). This method does not require that the steps be performed in any specific order.

The as-needed step provides for the instantiation (i.e., the computer generation of something that is then made available to a user) of applicable environmental areas and components. The as-needed step allows for instantiation of only that area of the environment (and its components) which currently is needed by the user. For example, a single user in an environment would require only as much environment as that user could perceive (e.g., visually or electronically) or impact (e.g., range of weapon system being employed) from the user's current location within the environment. (A user in an airplane would require more environment than a user on foot. A user with radar or a telescope would require more environment than one without any such tools.) As that user moved in relation to the currently instantiated environment, new environment areas would be instantiated as needed. This step assures that the user always is surrounded by and always will perceive the intended environment regardless of the extent of movement by that user. (Additional users would result in, at most, an increase in environment proportionate to the increase in users. Overlaps in the environment for different users would be common and would reduce the actual amount of environment required by multiple users.) This step allows for an infinite environment at an opportunity and resource cost associated with a very limited environment. The amount of area that is instantiated is determined by conditions of the specific application in use.

Once instantiated, an area of the environment will remain instantiated only as long as a user requires that area for the application in use. When no longer in use, an area will terminate or lapse (i.e., cease to be maintained). A lapsed area may, if desired, be reinstantiated exactly as it was prior to lapsing by utilizing the initial conditions which caused the area to be initially instantiated. Such initial conditions will be retained and accessible to the computer in order to exactly reinstantiate the lapsed area. Where the application allows the user (or other forces) to effect changes to the instantiated environment, those changes may also be included in the reinstantiated area if likewise retained and made accessible to the computer. For example, if one user marks the outside of a building as having been searched and cleared and then leaves the area sufficiently to cause it to lapse, a second user, upon moving within the overall environment such as to cause this area to be reinstantiated, will see the same building and the building will retain the markings as left by the first user.

The pseudo-random step for the generation of environmental components allows any degree of creative freedom or control in the presentation (e.g., size, shape, location, orientation, movement, density, transparency, etc.) of any instantiated components within any required rule set. Components will include: people; man-made objects (e.g., buildings, vehicles, transportation infrastructures); animate objects (e.g., animals, insects, rodents); natural features (e.g., water bodies, weather, vegetation, sky, terrain); natural forces (e.g., wind, hail, falling trees, and floods); and man-made forces (e.g., electricity, light, explosions, etc.). All components will be generated within the degree of controlled randomness determined appropriate for the specific application. Geo-specific and geo-typical variations may be specified at any step of the process. If recognizable objects and features were desired, certain minimal rule sets would be required regarding the instantiation of those objects and features. (For example, trees would be right side up and not floating in air, and roads would not run through buildings.) Most applications will impose geo-specific and cultural limitations on the instantiation of components while allowing for the degree of randomness that most closely approximates a real-world environment. The data files for these components may be internal or external to the computer system that will instantiate the components. The number, variety and detail of components will be limited only by the data files available and suitable for the specific application in use (most often a real-time application).

A very desirable, but not essential, step is nested fidelity. The nested fidelity step provides a continuously increasing level of detail that is limited only by the data files available and suitable for the specific application in use (most often a real-time application). The following increasing level of detail scenario is provided as an example: a house identified by street number; a room within that house identified by its contents (e.g., dining room or blue bathroom); a closet within that room identified by location (e.g., on north wall); a box within that closet identified by shape and color (e.g., round, 12 inches in diameter and gold in color); an explosive device within that box identified by components typical for such devices (e.g., timer, detonator, explosive material, and wires); subcomponents of the identified components; and so on. Such a level of potentially unlimited detail becomes a practical possibility only because of the as-needed step which instantiates only that detail needed at a given point in time based upon user position and interaction with the environment. For example, the contents of the 12-inch golden round box would not exist until it was about to be acted upon (e.g., opened or moved) by the user or other forces (e.g., earthquake, flood waters, or other explosive force). The pseudo-random step allows for controlled or random (within preset rules) contents of the box.

DESCRIPTION OF THE DRAWING

The single FIGURE shows a block diagram of the steps of the preferred embodiment of the method claimed with arrows indicating the flow of data.

DESCRIPTION OF THE PREFERRED EMBODIMENT

Referring now to the FIGURE wherein like numbers represent like steps, the most basic embodiment of the method claimed is first described, and then the preferred embodiment. The numbering of steps is for reference only. The steps and the coordination between steps may occur in any order.

In the most basic embodiment, an initial area of the environment will be instantiated by the as-needed step, block 1. The initial area to be instantiated will be uniquely defined by certain initial conditions and inputs. The initial instantiated area may be exactly reinstantiated by recalling the initial conditions and inputs. As a default condition, the initial area will be instantiated a minimum distance around an initial point, object, or user. The initial area will be populated with a set of environmental components. The environmental components and other initial conditions (e.g., number of users and locations) may be: determined by the user application step, block 2, supplied as minimum environmental components by the as-needed step, obtained from the pseudorandom step, block 3, or from any combination of those steps.

Generally, the initial area (and later added areas) of the instantiated environment will obtain environmental components via the pseudo-random component-generating step. The pseudo-random step will utilize internal or external data files step, block 4, to define and generate components for the instantiated environment. The files to be used will be selected in the same manner as the initial conditions above. The type, quantity and diversity of components to be instantiated also will be determined in the same manner. The generated environment and components will then be instantiated, block 5, for the user. The user may then interface and interact, block 6, with the instantiated environment.

The order in which the steps are performed is not an essential part of the process. Environmental components can be generated prior to and become a part of the initial instantiation of areas, or the components can be added to the already instantiated area. User application inputs can be provided prior to and become a part of the initial instantiation of areas, or the inputs can be used to modify an already existing instantiated area.

The preferred embodiment incorporates the nested fidelity step, block 7, and emphasizes the almost limitless potential of the claimed method. The following example will focus upon the field of the invention. The objective of the user training application will be the training of personnel in the detection and identification of a specific individual (the suspect) carrying an explosive device within a populated urban environment. The searchers may be machines, humans, or a combination; however, humans will be used in the example. The searchers will be equiped with heat source sensing technology such that the number and location of potential suspects within buildings or the surrounding vegetation is readily known. Two searchers will be used to demonstrate the effects of overlapping instantiations of environmental areas and components. For simplification, the only heat source in the environment (other than the searchers) will be a stationary suspect. For this example, the user application step will have specified a geo-specific environment data file and the pseudo-random step will provide the components from that file. The user interface and interaction step will control the movements of the users/searchers in a real-time virtual environment. Using a virtual reality platform and adding sound and smell simulations could enhance the degree of realism for the trainees. However, for this example, a computer monitor and hand controls to direct the searchers (i.e., simulated humans) within the environment will be employed.

While a very complex and interactive exchange and updating of information and requirements will likely occur among the various steps during an actual application, the preferred embodiment assumes a very simplified interaction to facilitate the description. At the user application step, the complete requirements of the user will be specified such that the designed-in default conditions of the other steps are not required. (User requirements might include: initial area size and shape, number and location of users, geo-specific attributes, degree of randomness, data files to be used, and the perception and the equipment capabilities of the users.) The as-needed step takes these requirements and initial conditions and begins generating suitable areas of environment. The as-needed step also coordinates with the pseudo-random step as to the generation of components. The pseudo-random step obtains component selection, identification, and definition from the data file step and applies a degree of randomness appropriate for the specific application prior to furnishing these components to the as-needed step. The as-needed step will then instantiate the environment and components for the user.

The as-needed step will monitor all user interface and interaction with the instantiated environment and components. Adjustments to the instantiated environment and components will be made based upon the interfaces and interactions. For example, the instantiated environment and components would be altered to reflect that a vehicle was moved or a door was opened. Such adjustments, to include the instantiation of additional areas of environment, would flow through the same process as described above for the initial environment and components.

During the initial instantiation and subsequent adjustments, the nested-fidelity step will be employed by the as-needed step to determine the level of component detail required given the user's perception capabilities, location, direction, and interactions with the environment and components. As additional levels of detail are required, the as-needed step will request those additional components from the pseudo-random step.

The as-needed step will maintain a constant instantiation in real-time so that the user has immediate feedback from all interaction with the environment and components. In addition, the as-needed step will record all adjustments made to the instantiated environment and components which result from user interface and interaction. This record, in combination with the initial conditions, will allow the exact reinstantiation of any area and components which lapse due to non-use. The reinstantiated area and components will retain the adjustments which existed just prior to lapsing. Should it be desired, the reinstantiated area and components may reflect adjustments which would be appropriate for the time that has transpired since having lapsed.

The initial positions of each searcher and the suspect will be determined as part of the initial conditions above. A specified amount of area will be instantiated around each searcher. This initial instantiated area generally will be a square with the outer limits a set distance from the searcher at the center. The minimum (and most efficient) distance would be based upon: how far the searcher can perceive (i.e., see or detect with equipment), relevant information given the searcher's location, and the nature of the components surrounding the searcher (e.g., hills, clouds, night-time). When the two areas (one for each searcher) overlap as the movement of one searcher brings him within the environment that has been instantiated for the other searcher, the common instantiated area will be identical. (The amount of area around each searcher may be different because it depends upon the distance a specific searcher can perceive.) This commonality of overlap is accomplished by utilizing the pseudo-random generator and a set of initial conditions (e.g., initial location, initial inputs such as geo-specific selections, and initial direction) to generate a unique and essentially unlimited environment. Any specific square (or other specified shaped area) within that unique environment may be then instantiated as needed without instantiating any other portion of the environment. When an instantiated area no longer is needed (i.e., no searcher is within the set distance), that unneeded area will lapse and cease to exist. Such areas may be reinstantiated exactly as they were initially instantiated as noted above.

The searchers will have the ability to interact with the environment. They may open doors, operate vehicles, break windows, mark buildings as having been searched, and so on. These changes to the instantiated areas, which result from such interactions, may be stored and later used to exactly reinstantiate the area as it existed after interaction by the searcher. In addition, other forces over time may effect changes to the environment (e.g., a fallen tree from a storm may cause a power outage which renders the interior of a building being searched completely dark). The effects of such forces also may be stored and utilized when reinstantiating a lapsed area. The effects included in the reinstantiated area could be those which had occurred as of the time of lapse, or those that would have occurred given the time which has passed.

As a searcher comes within range of the suspect, his equipment will eventually direct him to a specific building (e.g., the suspect is located in the northeast portion of the third floor). As the searcher comes within range to perceive or act upon components of the environment, those components shall then (not sooner) be given increasing levels of detail, i.e., nested fidelity, as the following demonstrates: the building will be identifiable by street number, exterior features, and so on (which can be relayed to the other searcher); immediately prior to entering the ground floor of the building, the ground floor will be instantiated; the elevator with controls will be instantiated just before the doors open; the ground floor will lapse upon closing the elevator doors; the third floor of that building will be instantiated just before the elevator doors open; hallways, doors, windows, pictures, furniture will be instantiated within that third floor as needed; the room containing the suspect will be instantiated prior to the searcher entering it; the suspect's dress and characteristics will be instantiated when the searcher is within visual range; if fingerprints were to be taken, they would be instantiated just prior to being needed; and if the explosive device were not on the suspect's person, grease on his clothing might have been instantiated to infer that the suspect had been around machinery. The scenario is completed as follows without repeating that each component is instantiated only as needed and only for as long as it is needed: the searcher would then proceed to the basement where machinery and other components would be found; within a storage closet the searcher would find an air conditioning duct held in place with screws that showed recent scratches; an explosive device within that duct would be identifiable by components typical for such devices (e.g., timer, detonator, explosive material, and wires); and subcomponents of the identified components would be present upon inspection.

The combination of the as-needed and nested-fidelity steps provide a computer-generated environment that is essentially unlimited in area with a level of component detail restricted only by the current state of the art for such data files. This is achieved by the claimed method at a relatively low resource and opportunity cost.

Individually, the steps or substeps are well known to those skilled in the art and are taught by the prior art referenced below. The uniqueness of the present invention is in the combination of steps and not the method by which any one step is performed. Prior art is referenced to illustrate at least one teaching of each step or substep and is not intended to limit the methods by which each step may be performed.

While prior art that gives priority to regions or areas of interest has been identified, no prior art has been found which simply disregards areas until they are needed and then allows those areas to lapse when not in use. The same methods used to determine which regions will receive priority can be used for the as-needed step to determine which areas of environment will be instantiated and which will be allowed to lapse. See U.S. Pat. No. 6,128,019 (for a method of generating a database in which only desired regions of interest are completely reconciled) and U.S. Pat. No. 4,835,532 (for a method of determining what can be seen by an observer and then generating a simulation of only what can be seen).

The user application step is the typical exchange of information between the user and the computer that results in the computer having the necessary initial or default conditions and information to proceed with the process of creating and instantiating the environment and components. Frequently combined with the user interface and interaction step, the user application step may occur once, multiple times or continuously during an exercise using the computer-generated environment. See U.S. Pat. No. 6,275,227.

The pseudo-random step combines two substeps which are well known in the art into one unique step. This step utilizes a restricting method referred to as a rule set or parameter and a method for creating randomness within those sets or parameters. This unique step allows for any degree of limitation upon the possible range of the simulated environment and components. The range could be limited to what has been known or seen by man, it could allow for anything which complies with known or specified laws of physics, or it could allow for simulations which are outside of the currently understood laws of physics. The randomness component injects a degree of unpredictability within those rule sets or parameters. See U.S. Pat. No. 6,241,609 for the application of a rule set to limit or define the conditions relating to certain interactions. See U.S. Pat. No. 6,084,587 for the use of parameters to define or limit the range of allowable motions during a haptic interaction. See U.S. Pat. No. 4,835,532 for the use of computer-generated randomness during the placement of objects within a simulation.

Regarding the data files step, the use of files or libraries to store images or data and to selectively access those files or libraries for input into a computer-generated simulation is common practice. As long as those files or libraries are in, or can be converted to, a format useable by the computer generating the simulation, the location of the files or libraries (i.e., external or internal to the computer generating the simulation) is irrelevant. See U.S. Pat. No. 4,835,532.

Instantiation of environment step simply refers to the generation of an environment and then the delivery of that environment to a user or user's computer. Most prior art seems to assume the delivery as a part of the generation of the environment. The term instantiation was selected and defined to explicitly include both the generation and the delivery. Both U.S. Pat. No. 4,835,532 and U.S. Pat. No. 6,054,991 illustrate methods for the generation and delivery of a computer simulated environment.

The user interface and interaction step also is a very common step in most computer simulations. Preferably done in real-time to more realistically represent real-world interactions, it allows for user manipulation of the simulated environment and components. When desired, these manipulations by the user can be recorded for recall. In addition, these manipulations can be treated as further input to the as-needed step. By feeding these manipulations back into the process that instantiates the environment, the environment, in essence, can react to the manipulations. See U.S. Pat. No. 6,084,587 and U.S. Pat. No. 6,050,822.

The nested-fidelity step combines a common practice of giving greater detail to specific regions or objects with the as-needed step. Prior art appears to limit the amount or depth of additional detail in accordance with initial rule sets or parameters. The unique nested-fidelity step allows for amounts or depths of detail which are limited only by the available data files. The idea of providing increased detail to objects as they are approached within the simulation is not new; however, the idea of adding continuously increasing layers of detail on an as-needed basis is new. See U.S. Pat. No. 6,128,019.

I claim:

1. A method for instantiating a computer-generated environment containing components by invoking at least one rule set, which comprises the following steps:
   (a) instantiating as needed only a perceptible amount of the environment and the components;
   (b) terminating the instantiated environment and components when no longer perceptible; and
   (c) instantiating the environment and the components utilizing the rule sets to select from available data files.

2. The method as set forth in claim 1, further comprising the step of investing the components with nested fidelity.

3. The method as set forth in claim 2, further comprising the step of enabling users and forces to interact with the components and other users and forces.

4. The method as set forth in claim 3, further comprising the step of reinstantiating as needed environment and components which are identical to any previously terminated environment and components.

5. The method as set forth in claim 4, further comprising the step of retaining the impacts of the interaction by enabled users and forces when instantiating the previously terminated environment and components.

6. The method as set forth in claim 1, further comprising the step of enabling users and forces to interact with the environmental components and other users and forces.

7. The method as set forth in claim 6, further comprising the step of instantiating as needed the environment and components which are identical to any previously terminated environment and components.

8. The method as set forth in claim 7, further comprising the step of retaining the impacts of the interaction by enabled users and forces when instantiating the previously terminated environment and components.

9. The method as set forth in claim 1, further comprising the step of instantiating as needed environment and components which are identical to any previously terminated environment and components.

* * * * *